Sept. 17, 1940.   J. E. LOVE   2,214,965
CROP LIFTER
Filed Oct. 17, 1938
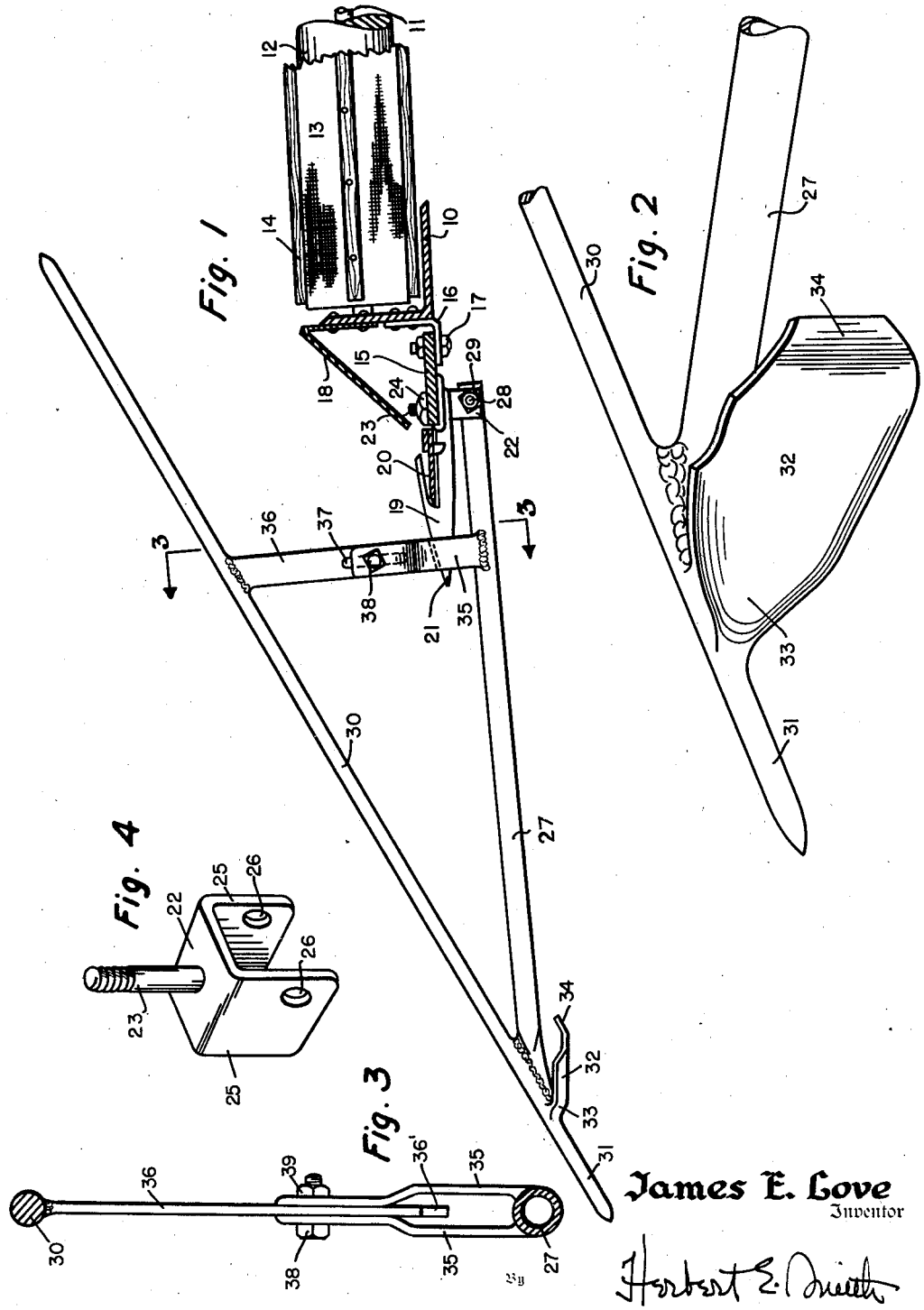
James E. Love
Inventor
Herbert E. Smith
Attorney Patented Sept. 17, 1940

2,214,965

UNITED STATES PATENT OFFICE 2,214,965

CROP LIFTER

James E. Love, Garfield, Wash.

Application October 17, 1938, Serial No. 235,377

8 Claims. (Cl. 56—313)

My present invention relates to improvements in crop lifters of the nature of attachments for harvesters which employ the reciprocating sickle, operating to cut a relatively wide swath through standing or down grain, or through low-lying crops, such as beans, peas, soy beans, etc.

The usual construction of such harvesters is the adoption to a horizontally supported sickle bar, of a number of sickle guards arranged in spaced relation to each other throughout the length of said bar. A reciprocably operated sickle or cutter knife works in conjunction with said guards to provide the required shearing necessary to effectively cut the stems of the crops to be harvested.

It has been found necessary, from practical experience, to provide means cooperating with said sickle guards whereby the crop is lifted above the guards to prevent injury to the upper stems and seed pods of the crops, due to their natural tendency to bunch in the knives and also to prevent jamming the reciprocable knife where the material being cut has grown profusely.

My present invention involves a crop lifter of the type illustrated in the patents to Horace D. Hume and James E. Love, Nos. 2,141,299 and 2,141,300, issued December 27, 1938. This invention contemplates improvements over the inventions of the above patents in the means by which the lifter bar may be adjusted with relation to the ground surface and in its cooperation with the finger guard.

Because there are several types of sickle guards manufactured, a crop lifter to be readily usable must be designed so as to be adaptable to varying requirements.

The principal object of my invention, therefore, is to provide a simple and efficient crop lifter for attachment to a finger guard.

Another object of my invention is the provision of a crop lifter which can be manufactured for attachment to various types of sickle guards.

A further object of the invention is to provide a crop lifter which may be quickly and conveniently adjusted to harvesting conditions, or to other lifters to maintain uniformity of operation throughout the length of the cutter bar.

Other objects and advantages of the invention will be apparent during the course of the following description.

In the accompanying drawing, forming a part of this specification, and in which like numerals are employed to designate like parts throughout the same, Figure 1 is a vertical, cross-sectional view through a portion of a sickle bar and draper frame showing the device of my invention, in elevation, attached thereto, Figure 2 is a perspective view of a portion of the toe of my crop lifter, Figure 3 is a vertical, cross-sectional view taken on lines 3—3 of Figure 1, and Figure 4 is a perspective view of the pivot yoke utilized with my device for attaching it to a cutter bar.

In the drawing, wherein for the purpose of illustration, is shown a preferred embodiment of my invention, the numeral 10 indicates a portion of the customary draper frame used in harvesting machinery. Journalled in suitable bearings upon the frame 10 is a draper roller shaft 11 and the draper roller 12. The draper belt 13 and its slats 14 operate longitudinally in the frame 10 to transport cut grain or vines to one end of the draper.

A cutter bar 15 is attached to and supported in advance of the draper frame 10 by means of angle attaching clips 16 and bolts, as 17. An angularly disposed apron 18 is usually supported in advance of the draper frame to provide a guiding surface for cut material, as it passes rearwardly onto the draper belt.

Secured to the underside of the cutter bar 15 and in spaced relation to each other is a row of sickle guards, as 19. The reciprocating sickle or knife 20 cooperates with this row of guards and provides the shearing action which cuts the vines or stalks of the plants being harvested. The nose 21 of the guards serve to part the stalks or stems and lead the material into the knives. Customarily these guards are secured to the underside of the cutter bar by means of bolts.

In attaching my device, I withdraw certain of these guard bolts and substitute therefor a pivotal attaching yoke 22 having an upstanding threaded stud 23. The stud 23 is inserted through the guard and the cutter bar and a nut 24 rigidly tightens the elements together. The yoke is provided with a pair of depending legs 25—25 in which is a pair of pivot holes 26—26 which are offset from the longitudinal axis of the stud 23.

A support bar 27 is pivotally secured between the yoke legs 25—25 by means of a pivot bolt 28 and nut 29. The support bar is shown to be tubular and is the base upon which the parts comprising the lifter of my invention is constructed or erected.

Upon the forward end of the pivoted support bar 27 and at an angle thereto I attach a lifter bar 30 in such a manner that a portion extends below or beyond the point of juncture between the two elements to form a penetrator point 31. A ground shoe 32 is rigidly attached to the underside of the lifter bar 30 and comprises a spoon shaped toe 33 and an upturned heel 34. In normal cutting operations with devices of this nature, undulations resulting from previous cultivation or irrigation are usually encountered in traversing a field. The ground shoe 32 is adjusted so that it will ride over the ground and travel up and down within certain limits, due to this mentioned unevenness, with the penetrator point 31 digging into the ground slightly. In this way it is assured that the point of the lifter will always be under the plane of the surface crops and thus lift all that it engages. Rocks and other solid debris, of course, glance off and fall between the crop lifters.

Mounted upon the outer sides of the pivoted support bar 27, near its rear end, is a pair of upright guide legs 35—35. The middle portion of these legs are formed with offset bends so that the upper ends are brought into close proximity to each other. The space between these legs permits their engagement loosely over the nose 21 of the sickle guard 19.

Depending from the lifter bar 30 is a substantially vertical support bar 36 having a slot near its lower end. This bar 36 fits between the upper ends of the guide legs 35—35 and a bolt 38 passes through holes in the legs and the slot 37 in the support bar. A nut 39 tightens the elements together in their adjusted position. It will be apparent that the bar 36 is sufficiently long to extend downward into the open portion between the legs 35—35 and for its lower end 36' to engage the upper surface of a sickle guard 19. Through the medium of the slot 37 the bar 36 may be depressed and the length of the space between the legs 35—35 may be limited. The downward position of the crop lifter nose with relation to the sickle guard may thus be altered. If it is desired that a greater range of movement be provided for the penetrator nose and shoe, of course, the bolt 38 may be loosened and the space lengthened by raising the lifter bar 30 and the depending bar 36.

In order that a device of this nature be practical it is necessary that it can be adapted to fit several makes of sickle guards. The lack of uniformity in the manufacture of this type of guard has resulted in guards having varying over-all lengths from the nose to the rear-attaching hole. As shown in Figure 1, my crop lifter is attached to a guard of the shortest type, and to accommodate such a condition the U-shaped yoke 22 is set so that the offset holes 25—25 are to the rear of the axial center of the stud 23. In the event that it is desired to fit my lifter to a longer type of guard, the yoke 22 will be reversed in its attaching position and the offset holes will then come forward of the axis of the stud permitting a longer nosed guard to be engaged between the guide legs 35—35.

It is understood that the form of my invention, herewith shown and described, is to be taken as a preferred example of the same, and that various changes in the shape, size and arrangement of parts may be resorted to, without departing from the spirit of my invention, or the scope of the subjoined claims.

Having thus fully described my invention, what I claim as new and desire to secure by Letters Patent is:

1. In a harvesting mechanism of the type employing a reciprocating sickle and spaced guards therefore, a crop lifter for cooperation with said guards comprising a V-shaped frame having an upper lifter bar, and a lower support bar attached to the underside of a harvesting mechanism, and a brace between said support and lifter bars having means adapted to receive the nose of a guard to position the crop lifter in advance of the harvesting mechanism.

2. In a harvesting mechanism of the type employing a reciprocating sickle and spaced guards therefor, a crop lifter for cooperation with said guards comprising a V-shaped frame having an upper lifter bar, and a lower support bar pivotally attached to the underside of a harvester mechanism for vertical movement, and a brace between the arms of the V-frame having a guideway adapted to receive the nose of a sickle guard to limit the vertical movement of the crop lifter.

3. In a harvesting mechanism of the type employing a reciprocating sickle and spaced guards therefor, a crop lifter for cooperation with said guards comprising a V-shaped frame having an upper lifter bar, and a lower support bar pivotally attached to the underside of a harvesting mechanism, and a brace between the arms of the V-frame and comprising spaced guide legs mounted upon one of said arms forming a guide-way for the reception of the nose of a guard, and a support leg mounted upon the other arm for adjustable engagement between the ends of the spaced guide legs to vary the length of the guideway.

4. In a harvesting mechanism of the type employing a reciprocating sickle and spaced guards therefor, a crop lifter for cooperation with said guards comprising a V-shaped frame having an upper lifter bar, and a lower support bar pivotally attached to the underside of a harvester mechanism, a brace between the arms of the V-frame adapted to engage the nose of a sickle guard, a penetrator point on the forward end of said frame, and a ground shoe associated with the point for limiting the depth of penetration thereof.

5. In a harvester mechanism of the type employing a reciprocating sickle and spaced guards therefor, a crop lifter for cooperation with said guards comprising a support bar pivotally attached to the underside of a harvesting mechanism for vertical movement, a lifter bar extending rearwardly from the forward end of said support bar at an inclination thereto, a brace between the support bar and the lifter bar having means adapted to engage the nose of a sickle guard, a penetrator point extending forwardly and downwardly from the juncture of said bars, and a ground shoe associated with the point limiting the depth of penetration thereof.

6. In a harvesting mechanism of the type employing a reciprocating sickle and spaced guards therefor, a crop lifter for cooperation with said guards comprising a lower support bar pivotally attached to the underside of a harvesting mechanism for vertical movement, a lifter bar extending rearwardly from the forward end of said support bar at an upward inclination thereto, and a brace between the support bar and the lifter bar having a guide-way adapted to receive the nose of a guard.

7. In a harvesting mechanism of the type employing a reciprocating sickle and spaced guards therefor, a crop lifter for cooperation with said guards comprising a V-shaped frame pivotally attached to the underside of a harvester mechanism, a brace between the arms of the V-frame having means adapted to engage the nose of a sickle guard, a penetrator point on the forward end of said frame, a ground shoe associated with the point for limiting the depth of penetration thereof, and means on the brace for limiting the movement of the penetrator point in relation to the nose of the sickle guard.

8. In a harvesting mechanism of the type employing a reciprocating sickle and spaced guards therefor, a crop lifter for cooperation with said guards comprising a V-shaped frame pivotally attached to the underside of a harvester mechanism, a brace between the arms of the V-frame having means adapted to engage the nose of a sickle guard, a penetrator point on the forward end of said frame, and a ground shoe associated with the point for limiting the depth of penetration thereof, said shoe comprising a plate having a spoon-shaped toe and an upturned heel.

JAMES E. LOVE.